(12) United States Patent  
Mishina et al.

(10) Patent No.: US 12,042,823 B2
(45) Date of Patent: Jul. 23, 2024

(54) ARTICLE SORTING FACILITY

(71) Applicant: Daifuku Co., Ltd., Osaka (JP)

(72) Inventors: Yasuhisa Mishina, Hinocho (JP); Tadasuke Ogawa, Tokyo (JP); Kouji Fujita, Tokyo (JP); Kenichi Ukisu, Tokyo (JP); Nobuhiko Sato, Tokyo (JP); Masaya Miyamoto, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/102,877

(22) Filed: Jan. 30, 2023

(65) Prior Publication Data

US 2023/0241647 A1 Aug. 3, 2023

(30) Foreign Application Priority Data

Jan. 31, 2022 (JP) ................. 2022-013485

(51) Int. Cl.
| | |
|---|---|
| *B07C 3/02* | (2006.01) |
| *B07C 5/36* | (2006.01) |
| *B60L 50/60* | (2019.01) |
| *B60L 53/10* | (2019.01) |
| *B65G 1/04* | (2006.01) |
| *B65G 1/137* | (2006.01) |
| *B65G 35/00* | (2006.01) |
| *B65G 47/46* | (2006.01) |
| *B65G 47/74* | (2006.01) |
| *B65G 47/96* | (2006.01) |

(Continued)

(52) U.S. Cl.
CPC ............. *B07C 3/02* (2013.01); *B65G 1/0492* (2013.01); *B65G 1/1378* (2013.01); *B65G 47/74* (2013.01); *G05D 1/0289* (2013.01)

(58) Field of Classification Search
CPC .... B07C 3/02; B07C 3/06; B07C 5/36; B65G 1/0492; B65G 1/12; B65G 1/1378
USPC .......................................................... 209/606
See application file for complete search history.

(56) References Cited

U.S. PATENT DOCUMENTS

| | | | |
|---|---|---|---|
| 7,894,932 B2* | 2/2011 | Mountz ............... | G06Q 10/087 700/214 |
| 7,991,505 B2* | 8/2011 | Lert, Jr. .............. | B65G 1/0492 700/214 |

(Continued)

FOREIGN PATENT DOCUMENTS

JP 2016113291 A 6/2016

*Primary Examiner* — Michael McCullough
*Assistant Examiner* — Molly K Devine
(74) *Attorney, Agent, or Firm* — The Webb Law Firm

(57) ABSTRACT

An article sorting facility includes: a first floor including a plurality of first travel paths; a second floor installed at a different height from the first floor in a vertical direction, and including a plurality of second travel paths; a plurality of first elevation mechanisms connecting terminating ends of the first travel paths to starting ends of the second travel paths; a plurality of second elevation mechanisms connecting terminating ends of the second travel paths to starting ends of the first travel paths; a plurality of receiving sections configured to receive articles from the transport vehicles; and at least one supply section configured to supply the articles to the transport vehicles. The plurality of second travel paths overlap corresponding first travel paths or corresponding receiving sections as viewed in the vertical direction, at least in a partial segment.

11 Claims, 9 Drawing Sheets

(51) Int. Cl.
*B66B 9/16* (2006.01)
*G05D 1/00* (2024.01)

(56) References Cited

U.S. PATENT DOCUMENTS 9,082,112 B2 * 7/2015 Sullivan ................. B65G 47/04
2017/0320102 A1 * 11/2017 McVaugh ............... B07C 5/361

* cited by examiner

ARTICLE SORTING FACILITY

CROSS-REFERENCE TO RELATED APPLICATION

This application claims priority to Japanese Patent Application No. 2022-013485 filed Jan. 31, 2022, the disclosure of which is hereby incorporated by reference in its entirety.

BACKGROUND OF THE INVENTION

1. Field of the Invention

The present invention relates to an article sorting facility configured to cause a plurality of transport vehicles to transport articles, thereby sorting the articles.

2. Description of the Related Art

An example of the above-described article sorting facility is disclosed in JP 2016-113291A (Patent Document 1). In the following, the reference numerals shown in parentheses in Description of the Related Art are those of Patent Document 1.

The article sorting facility (sorting apparatus 10) disclosed in Patent Document 1 includes a first floor (upper-level area A) on which a plurality of transport vehicles (automated guided vehicles 12) travel, and a second floor (lower-level area B) on which a plurality of transport conveyors 18 for transporting containers are provided. The first floor is provided above the second floor. The first floor includes a supply section (article supply section 6) that delivers articles to the transport vehicles, and a plurality of receiving sections (openings 8a) into which the articles are placed. A transport vehicle that has received an article from the supply section transports the article to one of the plurality of receiving sections, and places the article thereinto. On the second floor, containers (20) are disposed at positions respectively corresponding to the plurality of receiving sections. Accordingly, the articles that have been placed into the receiving sections are received by the containers (20), and the containers (20) are transported by the plurality of transport conveyors 18 and delivered to a packing worker.

In the article sorting facility disclosed in Patent Document 1, a plurality of passages for allowing the transport vehicles to travel are formed on the first floor. The plurality of passages include passages extending in directions intersecting each other, and these paths are formed intersecting each other at a plurality of locations. Accordingly, the transport vehicles need to pass through a plurality of intersections when traveling between the supply section and the receiving sections. In such a configuration, increasing the number of transport vehicles in order to increase the article transport efficiency tends to result in an event such as an increase in the number of times that the transport vehicles temporarily stop in front of the intersections in order to avoid collision between the transport vehicles at the intersections. Accordingly, it is difficult to effectively increase the transport efficiency of articles. It is also conceivable to increase, for example, the number of lanes in one passage or the number of passages per se in order to increase the transport efficiency of articles. However, such a configuration increases the area of the passages, and therefore the overall installation area of the facility as viewed in a vertical direction tends to be increased.

SUMMARY OF THE INVENTION

Therefore, in view of the foregoing, it is desirable to realize an article sorting facility capable of increasing the efficiency of the transport of articles by transport vehicles, while suppressing an increase in the size of the facility.

An article sorting facility according to the present disclosure is an article sorting facility configured to cause a plurality of transport vehicles to transport articles, thereby sorting the articles, the article sorting facility including: a first floor including a plurality of first travel paths along which the transport vehicles travel; a second floor installed at a different height from the first floor in a vertical direction, and including a plurality of second travel paths along which the transport vehicles travel; a plurality of first elevation mechanisms connecting terminating ends of the first travel paths to starting ends of the second travel paths, and configured to raise and lower the transport vehicles; a plurality of second elevation mechanisms connecting terminating ends of the second travel paths to starting ends of the first travel paths, and configured to raise and lower the transport vehicles; a plurality of receiving sections aligned along each of the plurality of first travel paths, and configured to receive the articles from the transport vehicles; and at least one supply section configured to supply the articles to the transport vehicles in at least one of the second travel paths or in a segment of at least one of the first travel paths, the segment being located on a starting end side of a receiving section group including the plurality of receiving sections disposed along the at least one first travel path, wherein the plurality of second travel paths overlap corresponding first travel paths or corresponding receiving sections as viewed in the vertical direction, at least in a partial segment.

Here, a transport vehicle to which an article has been supplied from the supply section travels along a first travel path, and transports the article to a receiving section among the plurality of receiving sections. The transport vehicle that has delivered the article to the receiving section thereafter travels along a second travel path, and returns to the supply section. With the present configuration, a first travel path serving as a sorting travel path and a second travel path serving as a return path for transport vehicles as described above can be separately disposed on an upper and a lower floor at different heights. Furthermore, end portions of the first travel path and the second travel path are connected to each other by the elevation mechanisms. Accordingly, even if a large number of travel paths for transport vehicles are set, it is possible to minimize the number of locations at which these travel paths intersect each other. Therefore, the efficiency of the transport of articles by the transport vehicles can be easily increased.

With the present configuration, the second travel paths overlap the corresponding first travel paths or the corresponding receiving sections as viewed in the vertical direction, at least in a partial section. Accordingly, even in a configuration including a plurality of first travel paths, a plurality of receiving sections, and a plurality of second travel paths, it is possible to minimize the installation area of the article sorting facility as viewed in the vertical direction.

In this manner, with the present configuration, it is possible to increase the efficiency of the transport of articles by the transport vehicles, while suppressing an increase in the size of the facility.

Further features and advantages of the article sorting facility will become apparent from the following description of illustrative and non-limiting embodiments with reference to the drawings.

DESCRIPTION OF THE INVENTION

Figure 1:
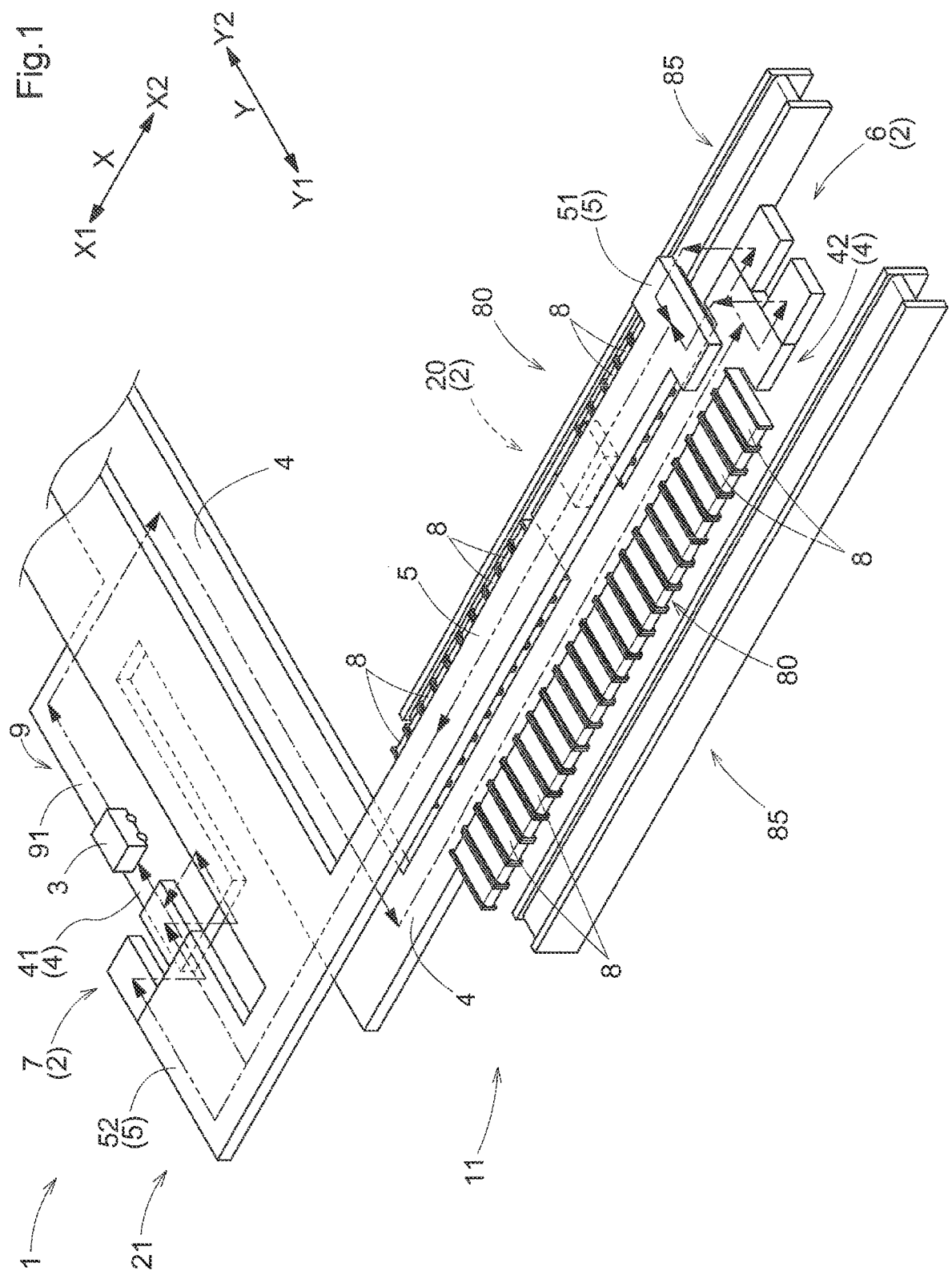
FIG. 1 is a perspective view of an article sorting facility.

An article sorting facility sorts and transports articles. An embodiment of the article sorting facility will be illustratively described with reference to the drawings.
Outline of Article Sorting Facility As shown in FIG. 1, an article sorting facility 1 causes a plurality of transport vehicles 3 to transport articles W, thereby sorting the articles W. In the present embodiment, the article sorting facility 1 includes a plurality of transport vehicles 3, a first floor 11, a second floor 21, a plurality of elevation mechanisms 2 configured to raise and lower the transport vehicles, a plurality of receiving sections 8 configured to receive the articles W from the transport vehicles 3, supply sections 9 configured to supply the articles W to the transport vehicles 3, and a control device H. In the present example, the article sorting facility 1 further includes transport devices 85. In the present embodiment, each of the plurality of transport vehicles 3 travels on the first floor 11 and the second floor 21 to transport the articles W. The first floor 11 and the second floor 21 are connected by the plurality of elevation mechanisms 2. This allows the plurality of transport vehicles 3 to travel to and from both the first floor 11 and the second floor 21. In the present example, each transport vehicle 3 receives an article W from a supply section 9 on the first floor 11, and transports the article W to a receiving section 8 among the plurality of receiving sections 8. The transport vehicle 3 that has transported the article W moves from the first floor 11 to the second floor 21. Then, after traveling on the second floor 21, the transport vehicle 3 moves to the first floor 11 and returns to the supply section 9 (see the arrows in FIG. 1). Another article W is newly supplied to the transport vehicle 3 that has returned to the supply section 9. In this manner, in the article sorting facility 1 of the present example, each of the plurality of transport vehicles 3 repeatedly transports articles W to the receiving sections 8.

Figure 4:
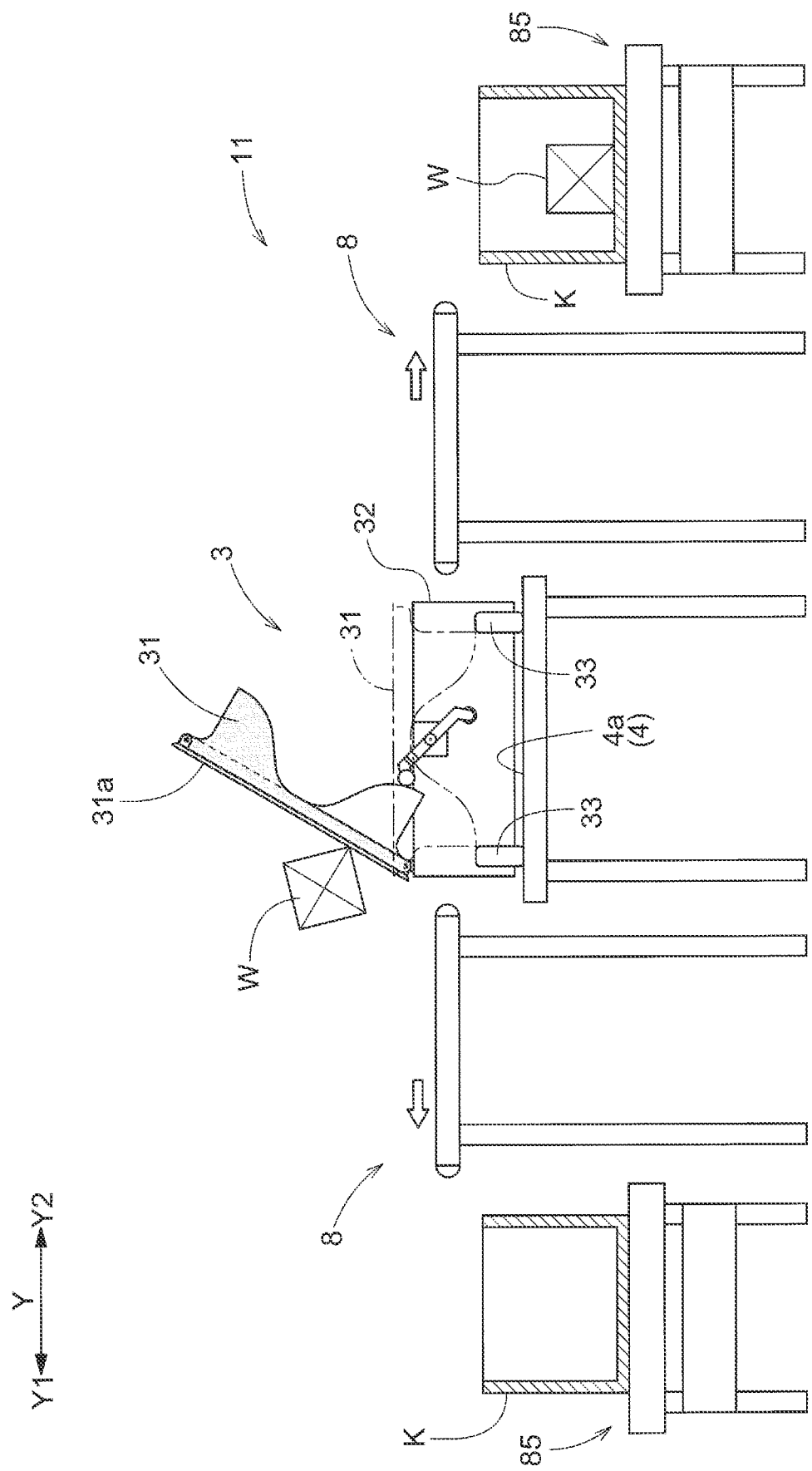
FIG. 4 is a front view showing a transport vehicle, a first travel path, receiving sections, and transport devices.
Figure 6:
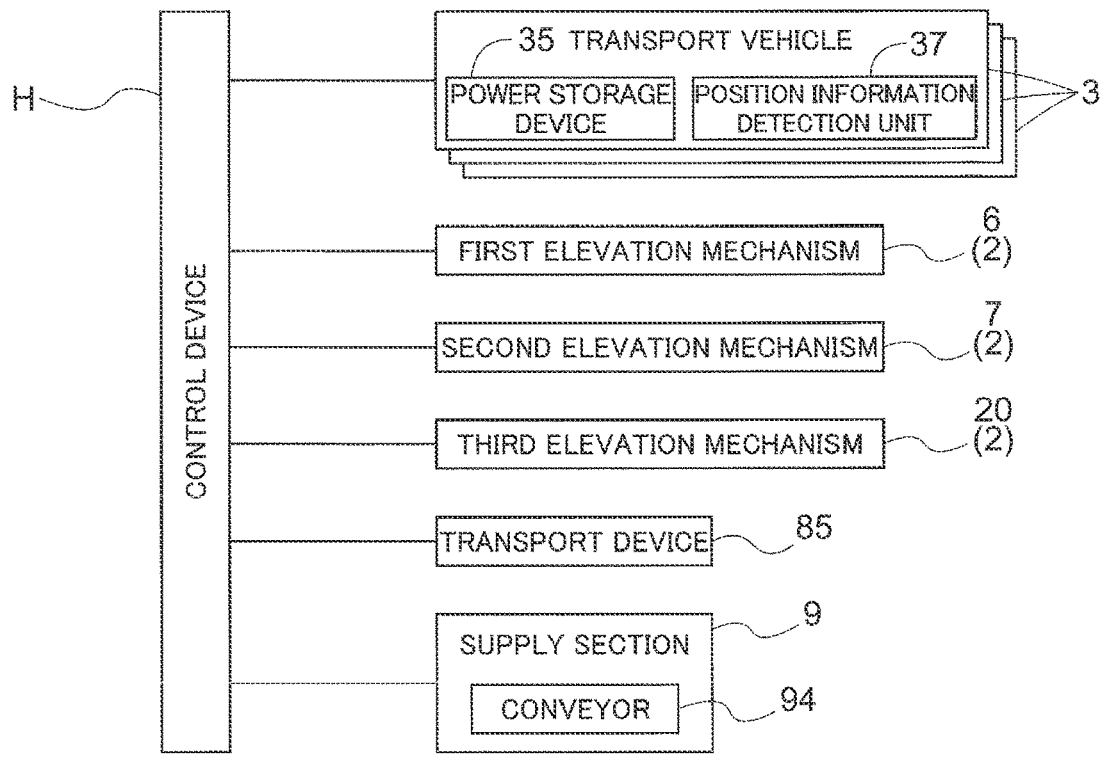
FIG. 6 is a control block diagram.

In the present embodiment, the description will be given assuming that a first direction X is the extension direction of sorting segments 4b of a plurality of first travel paths 4, and a second direction Y is a direction orthogonal to the first direction as viewed in a vertical direction. The first travel paths 4 and the sorting segments 4b will be specifically described later. In the present example, the description will be given assuming that a first side X1 is one side in the first direction X, and a second side X2 is the other side in the first direction X. Similarly, the description will be given assuming that a first side Y1 is one side in the second direction Y, and a second side Y2 is the other side in the second direction Y. In the following, specific configurations of the transport vehicles 3, the first floor 11, the second floor 21, the elevation mechanisms 2, and the control device H will be described.
Transport Vehicle In the present embodiment, as shown in FIG. 4, each transport vehicle 3 transports an article W with the article W placed thereon. As shown in FIG. 6, the transport vehicle 3 includes a power storage device 35, and travels using power from the power storage device 35. In the present example, the transport vehicle 3 includes a plurality of wheels 33 that roll on a traveling surface 4a, a main body portion 32 that houses the power storage device 35, and a placement portion 31 on which an article W is placed. The plurality of wheels 33 are attached to the main body portion 32. The placement portion 31 is configured to change in orientation between a horizontal orientation (see the dashed double-dotted line in FIG. 4) for transporting the article W placed on the placement surface 31a, and an inclined orientation (see the solid line in FIG. 4) for transferring the article W placed on the placement surface 31a to a receiving section 8. In the present example, each of the plurality of transport vehicles 3 is provided with a position information detection unit 37 (see FIG. 6). First travel paths 4 and second travel paths 5, which will be described later, are each provided with position information holders (not shown) at predetermined intervals. In response to a transport vehicle 3 moving along a first travel path 4 and a second travel path 5, the position information detection unit 37 of the transport vehicle 3 detects these position information holders. Examples of the position information holder include a bar code (one-dimensional code), a two-dimensional code, and an IC tag.

Figure 2:
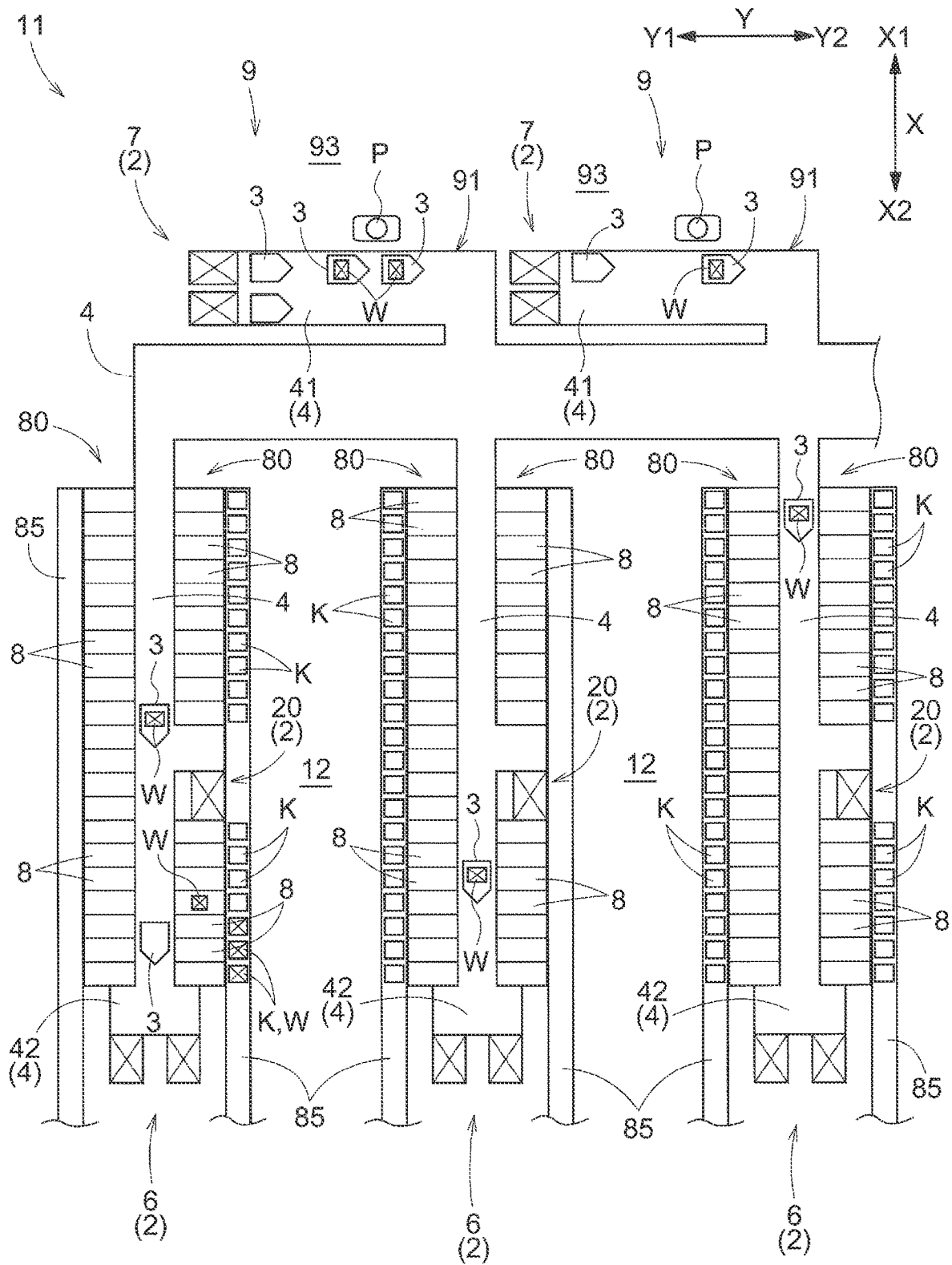
FIG. 2 is a plan view of a first floor.

Detection information that has been detected by the position information detection unit 37 is transmitted to the control device H from the transport vehicle 3. By transmitting the detection information, each of the plurality of transport vehicles 3 can inform the control device H of the position at which the transport vehicle 3 is currently located. That is, in the present example, the detection information includes position information of the transport vehicle 3.
First Floor As shown in FIGS. 1 and 2, the first floor 11 includes a plurality of first travel paths 4 along which the transport vehicles 3 travel. The first floor 11 is a region where articles W are transported by each of the plurality of transport vehicles 3, and where the transported articles W are sorted. In the present embodiment, the first floor 11 is formed extending in a planar shape. The first floor 11 includes a plurality of receiving sections 8, a plurality of supply sections 9, and transport devices 85 that are installed thereon. In the illustrated example, the first floor 11 is the floor surface of the article sorting facility 1.

Figure 5:
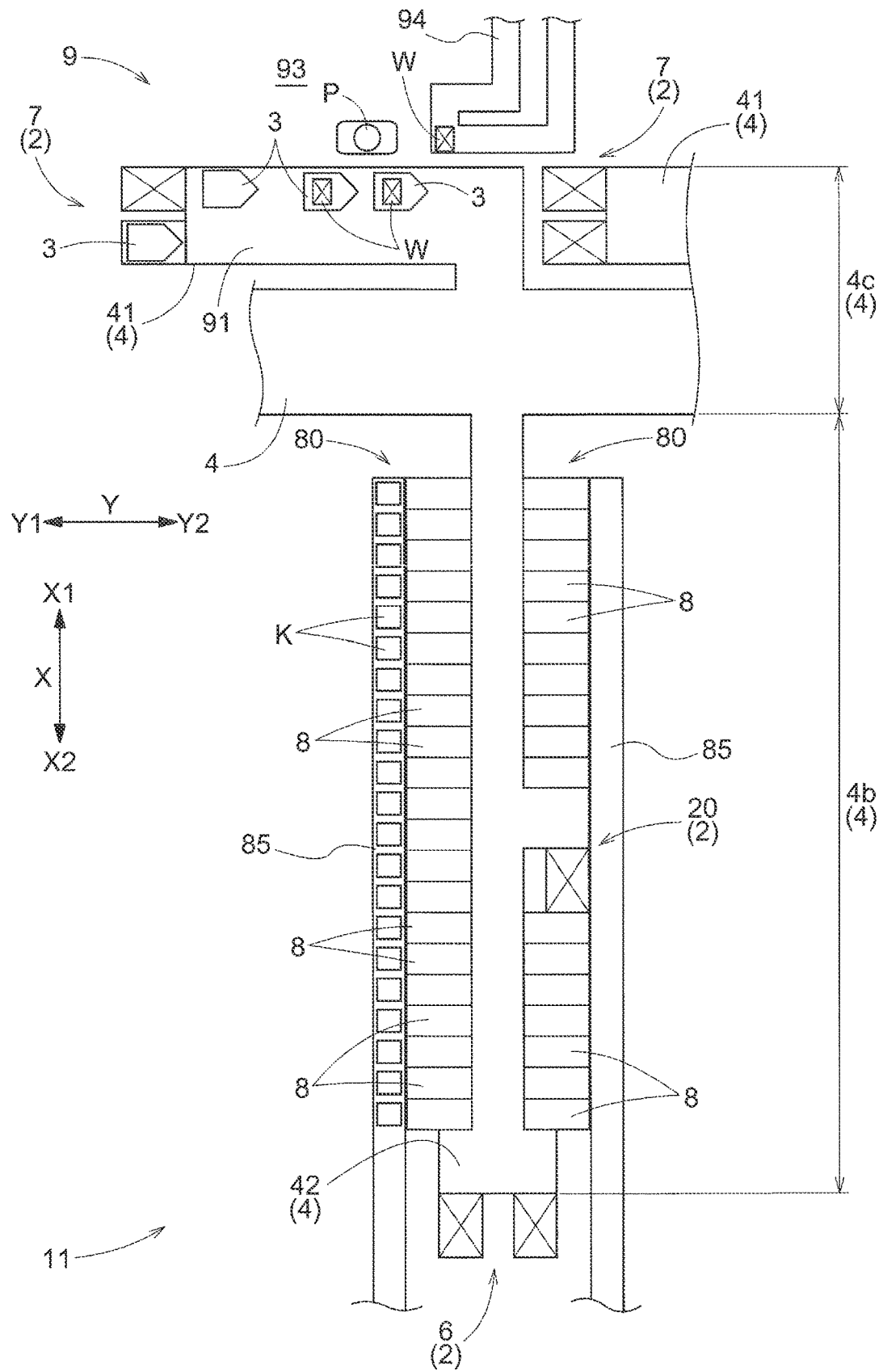
FIG. 5 is an enlarged plan view of the first floor.

As shown in FIGS. 2 and 5, the plurality of receiving sections 8 are disposed such that a plurality of receiving sections 8 are aligned along each of a plurality of first travel paths 4, and each of the plurality of receiving sections 8 receives articles W from the transport vehicles 3. In the present embodiment, the plurality of receiving sections 8 are aligned in the first direction X. In addition, the plurality of receiving sections 8 extend along sorting segments 4b, which will be described later, of the respective first travel paths 4. Each of the plurality of receiving sections 8 delivers, to the corresponding transport device 85, the articles W received from the transport vehicles 3. In the following, as shown in FIG. 2, a group of a plurality of receiving sections 8 disposed along each of the first travel paths 4 is referred to as a receiving section group 80. In the present embodiment, one receiving section group 80 includes a plurality of receiving sections 8 disposed along the corresponding sorting segment 4b. In the present example, the receiving section groups 80 extend in the first direction X, and are aligned in the second direction Y. In the illustrated example, a pair of receiving section groups 80 are disposed for one sorting segment 4b. That is, receiving section groups 80 (a plurality of receiving sections 8) are respectively disposed on both sides of each of the first travel paths 4 in the second direction Y. A space 12 that a worker P can enter is formed between a pair of receiving section groups 80 and a pair of receiving section groups 80 adjacent thereto.

In the present embodiment, as shown in FIG. 5, each of the plurality of first travel paths 4 includes a sorting segment 4b extending in the first direction X. In the present embodiment, as shown in FIG. 5, the sorting segment 4b is a segment of each first travel path 4 in which the receiving section groups 8 are disposed. The sorting segments 4b of the plurality of first travel paths 4 are disposed parallel to each other. As shown in FIG. 2, the plurality of sorting segments 4b are aligned in the second direction Y. That is, each of the plurality of sorting segments 4b extends in the first direction X, and the plurality of sorting segments 4b are separated from each other in the second direction Y. In the present example, each of the plurality of sorting segments 4b is connected to a first elevation mechanism 6, which will be described later, at an end portion thereof in a traveling direction (here, the second side X2 in the first direction) of the transport vehicle 3, or in other words, a terminating end 42 of the corresponding first travel path 4.

In the present example, as shown in FIG. 5, each of the plurality of first travel paths 4 includes a first merging segment 4c extending in the second direction Y. The first merging segment 4c is disposed on the first side X1 in the first direction of the sorting segment 4b. A transport vehicle 3 to which an article W has been supplied from a supply section 9 passes through the first merging segment 4c, and moves to the sorting segment 4b.

Here, in the present example, each first merging segment 4c includes a plurality of lanes, and is formed by a plurality of sorting segments 4b being connected to each other at ends thereof on the first side X1 in the first direction. Therefore, the first merging segment 4c of each of the first travel paths 4 is shared with a different first travel path 4. A partial region of a plurality of first merging segments 4c constitutes a buffer area 91, which will be described later, of the supply section 9.

In the present example, as shown in FIGS. 2 and 5, a plurality of transport devices 85 are provided on the first floor 11. Each of the transport devices 85 extends in the first direction X and adjacent to the corresponding receiving section group 80 as viewed in the vertical direction. The transport devices 85 each receive articles W from a plurality of receiving sections 8 belonging to the adjacent receiving section group 80, and transport the articles W to a shipping location.

In the illustrated example, a plurality of containers K respectively corresponding to the plurality of receiving sections 8 are aligned on each transport device 85. An article W that has been transported is housed in the corresponding container K on the transport device 85 from each of the receiving sections 8. Once articles W have been housed in all the containers K corresponding to one receiving section group 80, the transport device 85 corresponding to the receiving section group 80 is actuated and transports these articles W to the shipping location (not shown) together with the containers K. In the illustrated example, the transport device 85 is a belt conveyor.

In the example shown in FIG. 4, a pair of receiving sections 8 are respectively disposed on both sides of the sorting segment 4b of each of the first travel paths 4 in the second direction Y. Each of the transport devices 85 is disposed outward of the corresponding receiving section 8 in the second direction Y. Each receiving section 8 includes a belt conveyor that transports articles W in the second direction Y. The first travel path 4 includes a traveling surface 4a that supports the transport vehicle 3 from below and on which the wheels 33 of the transport vehicle 3 can roll. The traveling surface 4a is disposed at a position above the floor surface of the first floor 11. Once a transport vehicle 3 with an article W placed thereon has stopped at the position of the traveling surface 4a adjacent to a receiving section 8 as a transport destination, the transport vehicle 3 changes the orientation of the placement portion 31 from the horizontal orientation to the inclined orientation. Then, the article W placed on the placement surface 31a is transferred onto the transport surface of the receiving section 8. The article W is transported in the second direction Y by the receiving section 8, and housed in a container K placed on the transport device 85. In this manner, a plurality of transport vehicles 3 transport articles W to receiving sections 8, whereby the articles W are sorted into a plurality of containers K.

As shown in FIGS. 1, 2, 5, and 10, each supply section 9 supplies articles W to the transport vehicles 3 either in the second travel path 5, or in a segment of the first travel path 4 on the starting end side relative to the receiving section groups 80. In the present embodiment, the supply section 9 is disposed on the starting end side (first side X1 in the first direction) of the first travel path 4 relative to the receiving section groups 80. In other words, the supply section 9 is disposed on the starting end side (first side X1 in the first direction) of the first travel path 4 relative to the sorting segment 4b. In the present example, the supply section 9 overlaps a portion of the first merging segment 4c of the first travel path 4. In the present embodiment, as shown in FIG. 2, a plurality of supply sections 9 are aligned in the second direction Y. In the present example, a plurality of supply sections 9 are disposed respectively corresponding to the plurality of sorting segments 4b. Note that the number of supply sections 9 may be smaller than the number of sorting segments 4b, or may be greater than or equal to the number of sorting segments 4b. A single supply section 9 may be disposed on the first floor 11.

In the present embodiment, as shown in FIGS. 2 and 5, each of the plurality of supply sections 9 includes a buffer area 91 in which to arrange the plurality of transport vehicles 3, and a work area 93 in which to accommodate a supply device 92 that performs a supply operation of supplying articles W to the transport vehicles 3 located in the buffer area 91, or a worker P that performs the supply operation. In the present example, each of the plurality of supply sections 9 includes the work area 93 for the worker P that performs the supply operation. On the other hand, in the example shown in FIG. 11, which will be referenced later, the supply device 92 is disposed in the work area 93. In the work area 93, the worker P places an article W on an empty transport vehicle 3 disposed in the buffer area 91 (i.e., a transport vehicle 3 with no article W placed thereon). Here, in the present example, the buffer area 91 is disposed in a partial region of the first merging segment 4c of each of the first travel paths 4. A starting end of the buffer area 91 is connected to a second elevation mechanism 7 described below. In the illustrated example, the buffer area 91 is the region of an end portion of the first merging segment 4c on the first side X1 in the first direction. The buffer area 91 extends in the second direction Y. Also, an empty transport vehicle 3 that has been received from the second elevation mechanism 7 is disposed in the buffer area 91.

In the illustrated example, each supply section 9 further includes a conveyor 94. The conveyor 94 transports articles W from an automatic warehouse (not shown) to the work area 93. The worker P performs an operation of transferring the articles W transported from the conveyor 94 to empty transport vehicles 3 disposed in the buffer area 91.

Second Floor

Figure 3:
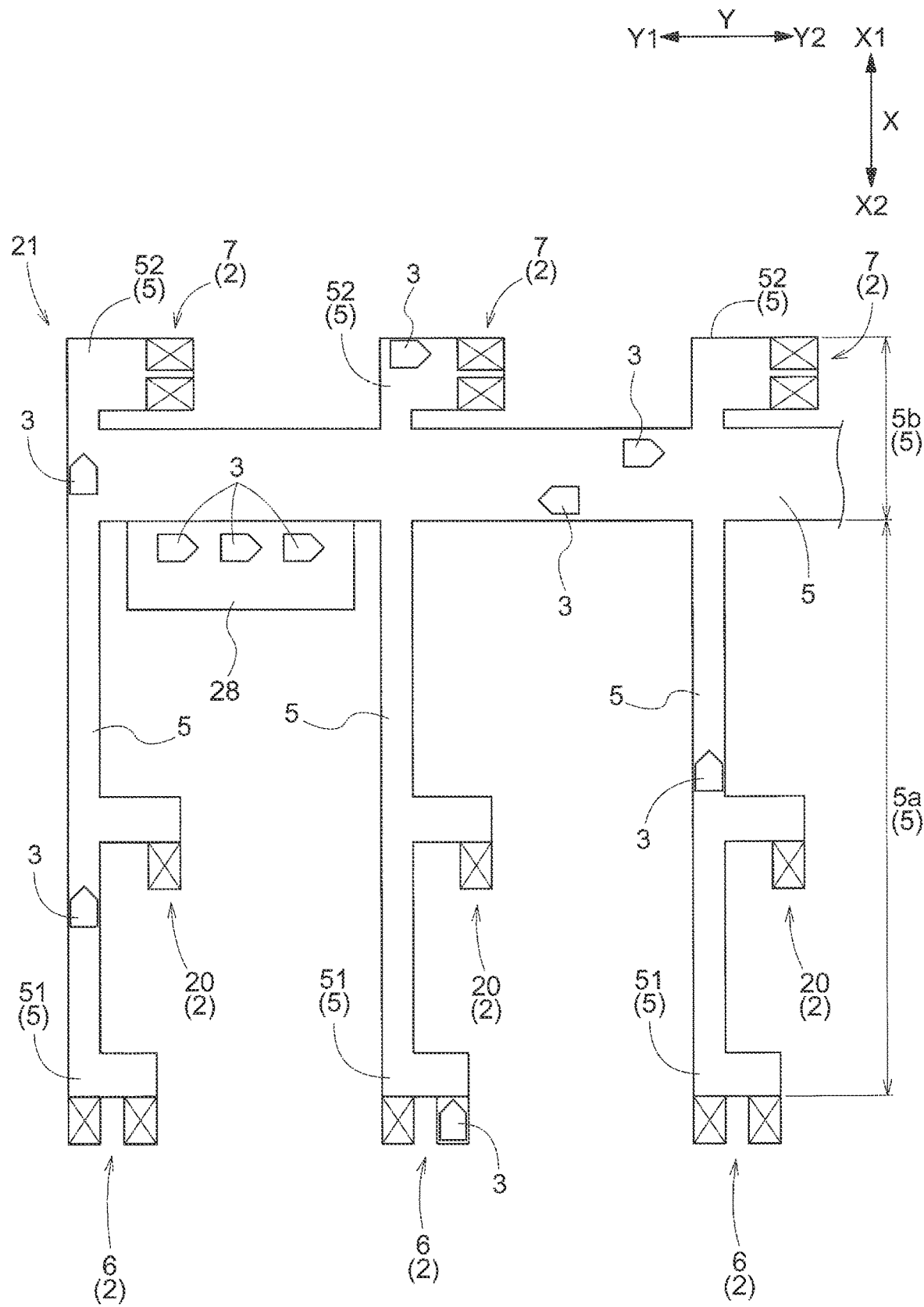
FIG. 3 is a plan view of a second floor.

As shown in FIGS. 1 and 3, the second floor 21 is installed at a different height from the first floor 11 in the vertical direction, and includes a plurality of second travel paths 5 along which the transport vehicles 3 travel. The second floor 21 is a region in which empty transport vehicles that have transferred articles W to the receiving sections 8 of the first floor 11 travel. The first floor 11 and the second floor 21 may be provided at heights different from each other, and need not be physically divided by a floor surface or the like. In the present embodiment, the second floor 21 is disposed above the first floor 11. Also, the second floor 21 includes a plurality of second travel paths 5 that support the transport vehicles 3 from below, and that have a traveling surface on which the wheels 33 of the transport vehicles 3 can roll. In the present example, the second floor 21 is disposed above the transport vehicles 3 that travel along the first travel paths 4. Also, the second floor 21 is installed at a position in the vertical direction at which the second floor 21 does not interfere with articles W placed on the transport vehicles 3 on the first travel paths 4. In the example shown in FIG. 3, the second floor 21 is formed in a planar shape including transport surfaces of the second travel paths 5 and a charging section 28 described below.

As shown in FIG. 1, the plurality of second travel paths 5 overlap the corresponding first travel paths 4 or the corresponding receiving sections 8 as viewed in the vertical direction, in at least a partial segment. In the present embodiment, the plurality of second travel paths 5 overlap the corresponding first travel paths 4 as viewed in the vertical direction. In the present example, the plurality of second travel paths 5 are disposed corresponding to the plurality of first travel paths 4. More specifically, each of the plurality of second travel paths 5 includes a straight segment 5a and a second merging segment 5b. The plurality of straight segments 5a extend in the first direction X, and are separated from each other in the second direction Y. The plurality of straight segments 5a are disposed respectively corresponding to the respective sorting segments 4b of the plurality of first travel paths 4. Specifically, the plurality of straight segments 5a overlap the corresponding sorting segments 4b as viewed in the vertical direction. The plurality of second merging segments 5b also overlap the first merging segments 4c of the first travel paths 4 as viewed in the vertical direction. In the illustrated example, one straight segment 5a is disposed corresponding to one sorting segment 4b. Also, one straight segment 5a overlaps one sorting segment 4b corresponding thereto, as viewed in the vertical direction.

In the example shown in FIG. 3, each of the plurality of second merging segments 5b is disposed on the first side X1 in the first direction of the corresponding straight segment 5a. Here, each of the second merging segments 5b includes a plurality of lanes, and is formed as a result of a plurality of straight segments 5a being merged at end portions thereof on the first side X1 in the first direction. Therefore, the second merging segment 5b of each of the second travel paths 5 is shared with a different second travel path 5. In the example shown in FIGS. 1 and 3, rather than each straight segment 5a and the corresponding second merging segment 5b being disposed so as not to completely overlap a plurality of receiving sections 8 as viewed in the vertical direction, there is also a region in which at least either the straight segment 5a or the second merging segment 5b overlaps the receiving sections 8 as viewed in the vertical direction. In the present example, each of the plurality of straight segments 5a is connected to a first elevation mechanism 6, which will be described below, at a portion where the transport vehicles 3 start traveling, or in other words, at a starting end 51 of the corresponding second travel path 5.

In the present embodiment, as shown in FIGS. 2 and 3, the second floor 21 includes a number of second travel paths 5 greater than or equal to the number of first travel paths 4. In the present example, at least one straight segment 5a is disposed corresponding to one sorting segment 4b. In the illustrated example, as described above, one straight segment 5a is disposed corresponding to one sorting segment 4b (see FIG. 1). Accordingly, the second floor 21 includes the same number of straight segments 5a of second travel paths 5 as the number of sorting segments 4b of first travel paths 4.

In the present embodiment, as shown in FIG. 3, the second floor 21 includes a charging section 28 for charging the power storage devices 35 of the transport vehicles 3. This makes it possible to efficiently use a region of the second floor 21 in which no receiving section 8 is disposed. In the present example, the charging section 28 is disposed adjacent to a second merging segment 5b. The charging section 28 is configured in a planar shape to allow the plurality of transport vehicles 3 to be stopped in alignment. Once a transport vehicle 3 has recognized that the power storage amount in the power storage device 35 thereof is less than a predetermined power storage amount (e.g., less than 50% with respect to the power storage amount in the fully charged state), the transport vehicle 3 travels along the straight segment 5a, thereafter moves to the charging section 28, and stops there. The charging section 28 is capable of performing quick charging for the power storage device 35 of the transport vehicle 3, and the transport vehicle 3 for which charging has been completed returns to the supply section 9 of the first floor 11 from the second merging segment 5b. Note that the control device H may know the power storage amount of the power storage device 35 of each of the transport vehicles 3, and may control any transport vehicle 3 whose power storage amount is less than a predetermined power storage amount to move to the charging section 28. As for the configuration of the charging section 28, the charging section 28 may include a non-contact-type feeding device, or may include a contact-type feeding device.

Elevation Mechanism

As shown in FIGS. 1, 2, and 3, in the present embodiment, the plurality of elevation mechanisms 2 include a plurality of first elevation mechanisms 6, a plurality of second elevation mechanisms 7, and a plurality of third elevation mechanisms 20. The first elevation mechanisms 6, the second elevation mechanisms 7, and the third elevation mechanisms 20 each connect the first travel paths 4 of the first floor 11 to the second travel paths 5 of the second floor 21. The following describes the configurations of the first elevation mechanisms 6, the second elevation mechanisms 7, and the third elevation mechanisms 20.

As shown in FIGS. 1, 2, and 3, the plurality of first elevation mechanisms 6 connect the terminating ends 42 of the first travel paths 4 to the starting ends 51 of the second travel paths 5, and are configured to raise and lower the transport vehicles 3. In the present embodiment, each of the plurality of first elevation mechanisms 6 connects the terminating end of the sorting segment 4b of the corresponding first travel path 4 to the starting end of the straight segment 5a of the corresponding second travel path 5. Accordingly, an empty transport vehicle 3 that has delivered an article W to a receiving section 8 can move from the sorting segment 4b of the first floor 11 to the straight segment 5a of the second floor 21 via the first elevation mechanism 6. In the illustrated example, the first elevation mechanism 6 includes an elevation platform that moves in the vertical direction, and the transport vehicle 3 can move from the first floor 11 to the second floor 21 by riding on top of the elevation platform. The second elevation mechanism 7 and the third elevation mechanism 20 described below also have the same structure as the first elevation mechanism 6.

In the present embodiment, as shown in FIGS. 2 and 3, the plurality of first elevation mechanisms 6 include M first elevation mechanisms 6 (where M is a natural number) in correspondence with the terminating ends 42 of the plurality of first travel paths 4. M may be either the same number as, or a different number from N, which will be described below. In the present example, M is the same number as N. In the present example, at least one first elevation mechanism 6 is provided corresponding to the terminating end 42 of one first travel path 4. At least one first elevation mechanism 6 is provided corresponding to one sorting segment 4b. In the illustrated example, M=2, and a plurality of (here, two) first elevation mechanisms 6 are provided corresponding to one sorting segment 4b. That is, the number of first elevation mechanisms 6 is larger than the number of sorting segments 4b. Accordingly, even if the number of transport vehicles 3 traveling along the first travel path 4 is large, it is possible to reduce the possibility that congestion occurs in front of the first elevation mechanisms 6. Note that the number of first elevation mechanisms 6 may be the same as the number of sorting segments 4b, or may be smaller than the number of sorting segments 4b.

Furthermore, in the illustrated example, the same number of (here, two) first elevation mechanisms 6 are provided for a set of a sorting segment 4b and a straight segment 5a that overlap each other as viewed in the vertical direction. Accordingly, the number of first elevation mechanisms 6 is an integer multiple of the number of sets of sorting segments 4b and straight segments 5a that overlap each other as viewed in the vertical direction. However, the present invention is not limited to such a configuration, and the number of first elevation mechanisms 6 provided for a set of a sorting segment 4b and a straight segment 5a may be varied as appropriate. For example, different numbers of first elevation mechanisms 6 may be provided for two adjacent sets of sorting segments 4b and straight segments 5a.

As shown in FIGS. 2 and 3, the plurality of second elevation mechanisms 7 connect the terminating ends 52 of the second travel paths 5 to the starting ends 41 of the first travel paths 4, and raise and lower the transport vehicles 3. In the present embodiment, each of the plurality of second elevation mechanisms 7 connects the terminating end of the second merging segment 5b of the corresponding second travel path 5 and the starting end of the first merging segment 4c of the corresponding first travel path 4. Accordingly, an empty transport vehicle 3 traveling along the second travel path 5 can move from the second travel path 5 of the second floor 21 to the first travel path 4 of the first floor 11 via the second elevation mechanism 7. In the present example, each of the plurality of second elevation mechanisms 7 connects the terminating end of the corresponding second merging segment 5b to the starting end of the corresponding buffer area 91. Accordingly, the transport vehicle 3 is transferred from the second merging segment 5b to the buffer area 91 via the second elevation mechanism 7.

In the present embodiment, as shown in FIGS. 2 and 3, the plurality of second elevation mechanisms 7 include N second elevation mechanisms 7 (where N is a natural number) in correspondence with the starting ends 41 of the plurality of first travel paths 4. In the present example, a plurality of second elevation mechanisms 7 are provided corresponding to the plurality of buffer areas 91. In the illustrated example, N=2, and a plurality of (here, two) second elevation mechanisms 7 are provided corresponding to one buffer area 91 (the region of the starting end 41 of the first travel path 4). That is, the number of second elevation mechanisms 7 is larger than the number of buffer areas 91. In the present example, a plurality of second elevation mechanisms 7 are provided also corresponding to the straight segments 5a of the second travel paths 5. In the illustrated example, a plurality of (here, two) second elevation mechanisms 7 are provided corresponding to one straight segment 5a. That is, the number of second elevation mechanisms 7 is larger than the number of straight segments 5a. In this manner, in the illustrated example, the second elevation mechanisms 7 are installed such that the number thereof is larger than the number of straight segments 5a and the number of buffer areas 91. Note that the number of second elevation mechanisms 7 may be the same as the number of buffer areas 91 and the number of straight segments 5a, or may be smaller than the number of buffer areas 91 and the number of straight segments 5a.

Furthermore, in the illustrated example, the same number of (here, two) second elevation mechanisms 7 are connected to each of the plurality of buffer areas 91. That is, the number of second elevation mechanisms 7 is an integer multiple of the number of buffer areas 91. However, different numbers of second elevation mechanisms 7 may be connected to the buffer areas 91.

In the present example, the number of first elevation mechanisms 6 and the number of second elevation mechanisms 7 are the same. That is, the first floor 11 and the second floor 21 are connected by the same numbers of first elevation mechanisms 6 and second elevation mechanisms 7. Accordingly, the transport vehicles 3 can relatively smoothly travel to and from the first floor 11 and the second floor 21.

In the present embodiment, as shown in FIGS. 2, 3, and 5, the third elevation mechanisms 20 connect an intermediate position along the first travel path 4 and an intermediate position along the second travel path 5, and raise and lower the transport vehicles 3. In the present example, each third elevation mechanism 20 connects an intermediate position of the sorting segment 4b of the corresponding first travel path 4 and an intermediate position of the straight segment 5a of the corresponding second travel path 5. A plurality of third elevation mechanisms 20 are provided respectively corresponding to the plurality of sorting segments 4b and straight segments 5a. In the illustrated example, one third elevation mechanism 20 is provided for a set of a sorting segment 4b and a straight segment 5a that overlap each other as viewed in the vertical direction. The third elevation mechanism 20 is provided adjacent to a set of a sorting segment 4b and a straight segment 5a. Here, it is preferable that the number of third elevation mechanisms 20 that are to be installed can be changed as appropriate according to, for example, the number of receiving sections 8 constituting each receiving section group 80, the type of articles W that are to be transported, and the number of transport vehicles 3.

Control Device

In the present embodiment, as shown in FIG. 6, the control device H controls a plurality of transport vehicles 3. In the present example, the control device H controls the first elevation mechanism 6, the second elevation mechanism 7, the third elevation mechanism 20, and the transport device 85, in addition to the plurality of transport vehicles 3. In the illustrated example, the control device H further controls the conveyor 94 of the supply section 9. The control device H is configured to be capable of communicating with the control units of the transport vehicles 3, the first elevation mechanism 6, the second elevation mechanism 7, the third elevation mechanism 20, the transport device 85, and the conveyor 94, and is configured to be capable of acquiring operating states of the control units, and outputting a command to each of these control units. The control device H and these control units each include, for example, a processor such as a microcomputer and a peripheral circuit such as a memory. Various functions are implemented by these pieces of hardware working cooperatively with a program executed on a processor such as a computer. In the following, a description will be given with reference to the state transition diagram shown in FIG. 7 and the flowcharts shown in FIGS. 8 and 9, focusing on the control of the transport vehicles 3 performed by the control device H.

The control device H designates a receiving section 8 as a transport destination for an article W that is transported into a supply section 9 (step #01). In the illustrated example, the control device H designates a receiving section 8 as a transport destination for an article W placed on the placement portion 31 of a transport vehicle 3. Then, the control device H controls the transport vehicle 3 to transport the article W to the designated receiving section 8. The control of the transport vehicle 3 for transporting the article W to the receiving section 8 includes control to cause the transport vehicle 3 to travel to a position corresponding to the receiving section 8, and control to transfer the article W from the transport vehicle 3 to the receiving section 8 at the position. After transferring the article W to the designated receiving section 8 (step #02), the transport vehicle 3 transmits a signal to the control device H. Upon receiving the signal, the control device H designates a first elevation mechanism 6 or a third elevation mechanism 20 for moving the transport vehicle 3 to a second travel path 5 (step #10). Then, the control device H controls the transport vehicle 3 to move to the designated elevation mechanism 2 out of the first elevation mechanism 6 and third elevation mechanism 20. After moving to the designated elevation mechanism 2 out of the first elevation mechanism 6 and the third elevation mechanism 20 (step #03), the transport vehicle 3 transmits a signal to the control device H. Upon arriving at the second travel path 5 via the elevation mechanism 2 (step #04), the transport vehicle 3 transmits a signal to the control device H. Upon receiving the signal, the control device H designates one supply section 9 from among the plurality of supply sections 9 (step #20). The control device H controls the transport vehicle 3 to move to the second elevation mechanism 7 connected to the buffer area 91 of the designated supply section 9. After moving to the designated supply section 9 via the second elevation mechanism 7 (step #05), the transport vehicle 3 transmits a signal to the control device H.

Note that at the same time as designating a receiving section 8 as a transport destination for an article W that is transported into a supply section 9 (step #01), the control device H may designate a first elevation mechanism 6 or a third elevation mechanism 20 for moving the transport vehicle 3 that has transported the article W (step #10). That is, the designation of a first elevation mechanism 6 or a third elevation mechanism 20 for moving, from the first floor 11 to the second floor 21, the transport vehicle 3 that has transported the article W may be performed before completion of the transport of the article W to the receiving section 8.

Figure 7:
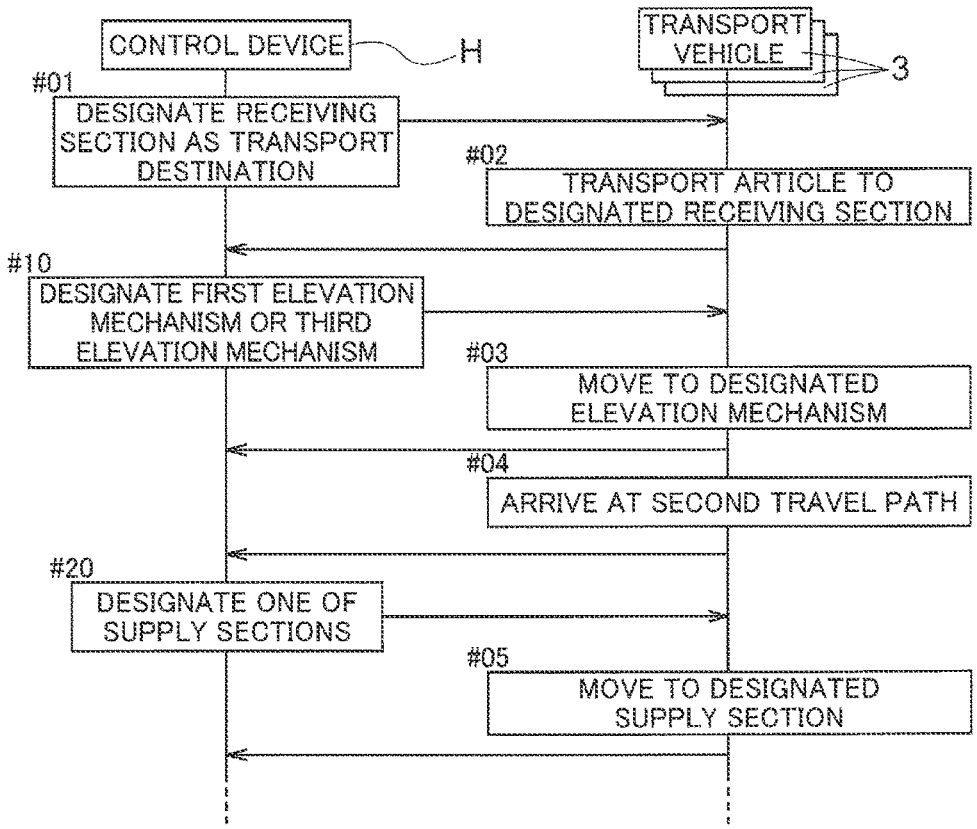
FIG. 7 is a state transition diagram of a control device and transport vehicles.
Figure 8:
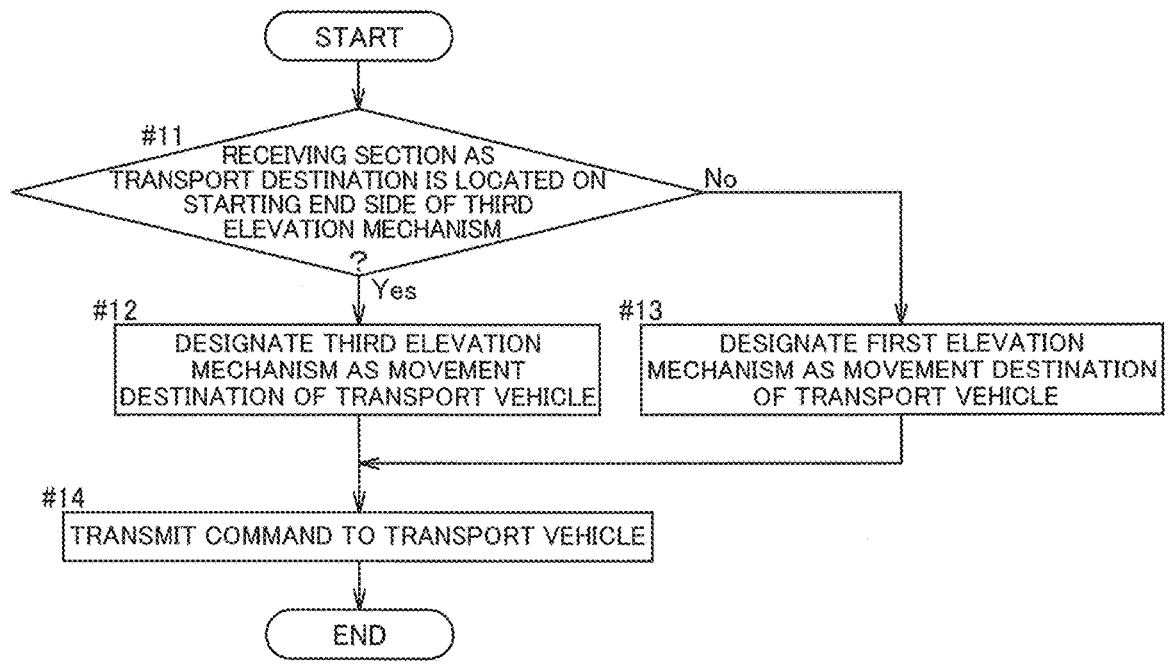
FIG. 8 is a flowchart illustrating control performed by the control device.

FIG. 8 is a flowchart illustrating the step in which the control device H designates a first elevation mechanism 6 or a third elevation mechanism 20 (step #10 in FIG. 7). As shown in FIG. 8, the control device H first determines whether or not the receiving section 8 designated as the transport destination is disposed on the starting end side (starting end side of the first travel path 4) of the third elevation mechanism 20 (step #11). Then, in response to determining that the receiving section 8 designated as the destination is located on the starting end side of the third elevation mechanism 20 (step #11: Yes), the control device H designates the third elevation mechanism 20 as a movement destination of the transport vehicle 3 (step #12). Furthermore, the control device H transmits, to the transport vehicle 3 that has transported the article W to the receiving section 8, a command to move to the third elevation mechanism 20 (step #14). On the other hand, in response to determining that the receiving section 8 designated as the transport destination is not located on the starting end side of the third elevation mechanism 20 (step #11: No), the control device H designates the first elevation mechanism 6 as a movement destination of the transport vehicle 3 (step #13). Then, the control device H transmits, to the transport vehicle 3 that has transported the article W to the receiving section 8, a command to move to the first elevation mechanism 6 (step #14).

In the present embodiment, the control device H controls travel of the plurality of transport vehicles 3 such that the numbers of transport vehicles 3 aligned in the buffer areas 91 of the plurality of supply sections 9 become closer to being equal to each other. In the present example, the control device H controls a transport vehicle 3 traveling along the second travel path 5 such that the transport vehicle 3 moves to the supply section 9 having the smallest number of transport vehicles 3 disposed in the buffer area 91 among the plurality of supply sections 9. In the present example, the control device H transmits, to a transport vehicle that has moved from the sorting segment 4b to the straight segment 5a, a command to move to the buffer area 91 having the smallest number of transport vehicles 3 among the plurality of buffer areas 91. The transport vehicle 3 that has received the command moves to the designated buffer area 91 as a movement destination via the corresponding second elevation mechanism 7.

Figure 9:
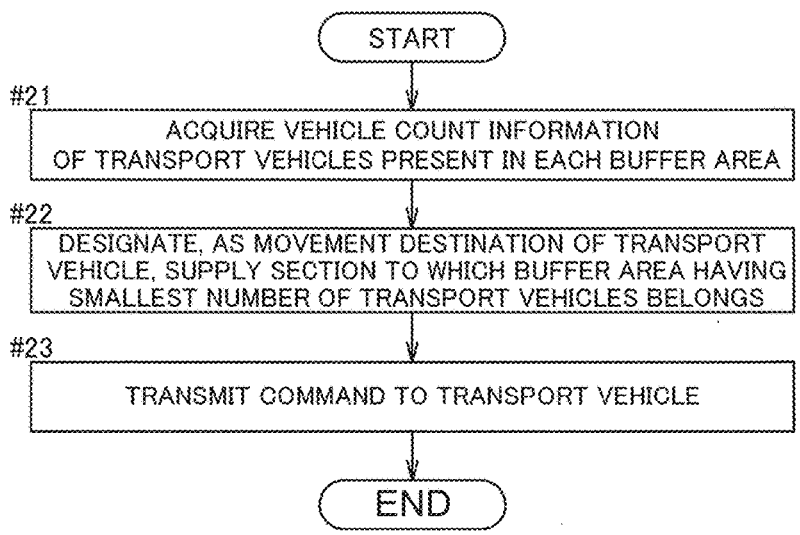
FIG. 9 is a flowchart illustrating the control performed by the control device.

FIG. 9 is a flowchart illustrating the step in which the control device H designates one supply section 9 from among the plurality of supply sections 9 (step #20 of FIG. 7). As shown in FIG. 9, the control device H first acquires vehicle count information regarding the number of transport vehicles 3 present in the buffer area 91 of each of the plurality of supply sections 9 (step #21). In the present example, the control device H can know the number of transport vehicles 3 present in each of the buffer areas 91 by acquiring the above-described detection information (position information) transmitted from each of the plurality of transport vehicles 3. Next, the control device H designates, as a movement destination of the transport vehicle 3, the supply section 9 to which the buffer area 91 having the smallest number of transport vehicles 3 belongs (step #22). Then, the control device H transmits, to a transport vehicle 3 traveling along the second travel path 5, a command to move to the buffer area 91 of the designated supply section 9 (step #23). Note that the command given to the transport vehicle 3 by the control device H may be transmitted while the transport vehicle 3 is traveling in the straight segment 5a, or may be transmitted at the timing when the transport vehicle 3 enters the second merging segment 5b. The control device H may designate, as the movement destination, the buffer area 91 having the smallest number of transport vehicles 3 among a plurality of buffer areas 91 located at positions close to the straight segment 5a in which the transport vehicle 3 to which the command is transmitted is traveling. For example, the buffer area 91 having the smallest number of transport vehicles may be selected out of the buffer area 91 located closest to the straight segment 5a in which the transport vehicle 3 to which the command is transmitted is traveling, and the buffer areas 91 located on both sides of the aforementioned buffer area 91.

Other Embodiments

Next, other embodiments of the article sorting facility will be described.

Figure 10:
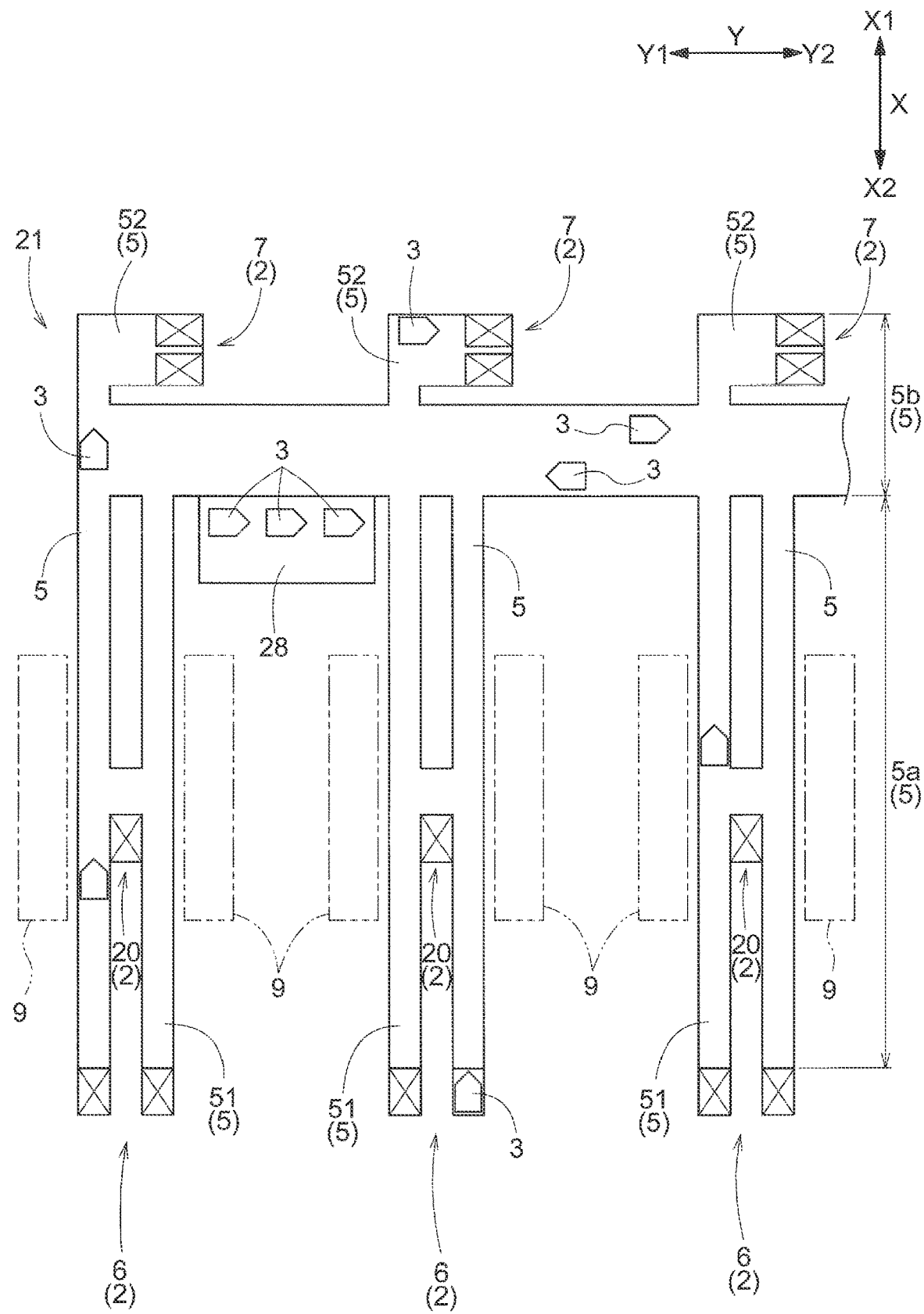
FIG. 10 is a plan view of a second floor according to an alternative embodiment.

(1) The above embodiment has described, as an example, a configuration in which each of the supply sections 9 supplies an article W to a transport vehicle 3 in a segment located on the starting end side of the corresponding first travel path 4 relative to the corresponding receiving section groups 80. However, the present invention is not limited to such a configuration, and it is possible to adopt a configuration in which each of the supply sections 9 supplies an article W to a transport vehicle 3 in the corresponding second travel path 5. FIG. 10 shows an example of such a configuration. In the example shown in FIG. 10, a plurality of supply sections 9 are disposed corresponding to a plurality of straight segments 5a. Also, each of the supply sections 9 is configured to supply an article W to an empty transport vehicle 3 in the corresponding straight segment 5a. In this case, each buffer area 91 may be disposed in a partial region of the corresponding straight segment 5a. Also, the buffer area 91 may be provided separately from the corresponding straight segment 5a in such a manner as to allow the transport vehicles 3 to travel back and forth between the straight segment 5a and the buffer area 91.

(2) The above embodiment has described, as an example, a configuration in which the second floor 21 is installed above the first floor 11. However, the present invention is not limited to such a configuration, and the second floor 21 may be installed below the first floor 11. In this case as well, it is preferable that each of the plurality of second travel paths 5 (the straight segment 5a, the second merging segment 5b) overlaps the corresponding first travel path 4 (the sorting segment 4b, the first merging segment 4c) or the corresponding receiving sections 8 as viewed in the vertical direction in at least a partial segment thereof.

(3) The above embodiment has described, as an example, a configuration in which the first floor 11 and the second floor 21 are connected by the same numbers of first elevation mechanisms 6 and second elevation mechanisms 7. However, the present invention is not limited to such a configuration, and the number of first elevation mechanisms 6 and the number of second elevation mechanisms 7 that connect the first floor 11 and the second floor 21 may be different from each other (4) The above embodiment has described, as an example, a configuration in which the number of straight segments 5a of the second travel paths 5 is the same as the number of sorting segments 4b of the first travel paths 4. However, the present invention is not limited to such a configuration, and the number of straight segments 5a of the second travel paths 5 may be larger than the number of sorting segments 4b of the first travel paths 4. That is, although the second floor 21 includes the same number of second travel paths 5 as the number of first travel paths 4 in the above embodiment, the second floor 21 may include a larger number of second travel paths 5 than the number of first travel paths 4. FIG. 10 shows an example of such a configuration. In the example shown in FIG. 10, a plurality of (here, two) straight segments 5a are disposed corresponding to one sorting segment 4b. That is, in the example shown in FIG. 10, for first travel paths 4 and second travel paths 5 that are connected to a common first elevation mechanism 6, the number of second travel paths 5 is larger than the number of first travel paths 4. A transport vehicle 3 that has transported an article W to a receiving section 8 travels along one of the plurality of straight segments 5a, and enters the corresponding second merging segment 5b. A transport vehicle 3 that has moved from a sorting segment 4b to the corresponding straight segment 5a by the third elevation mechanism 20 is also configured to travel along one of the plurality of straight segments 5a. In such a configuration, the plurality of second travel paths 5 overlap the corresponding first travel paths 4 and the corresponding receiving sections 8 as viewed in the vertical direction, at least in a portion thereof.

(5) The above embodiment has described, as an example, a configuration in which a plurality of sorting segments 4b are disposed parallel to each other. However, the present invention is not limited to such a configuration, and the plurality of sorting segments 4b need not be disposed parallel to each other.

(6) The above embodiment has described, as an example, a configuration in which the plurality of sorting segments 4b are aligned in the second direction Y. However, the present invention is not limited to such a configuration, and the plurality of sorting segments 4b need not be aligned in the second direction Y.

Figure 11:
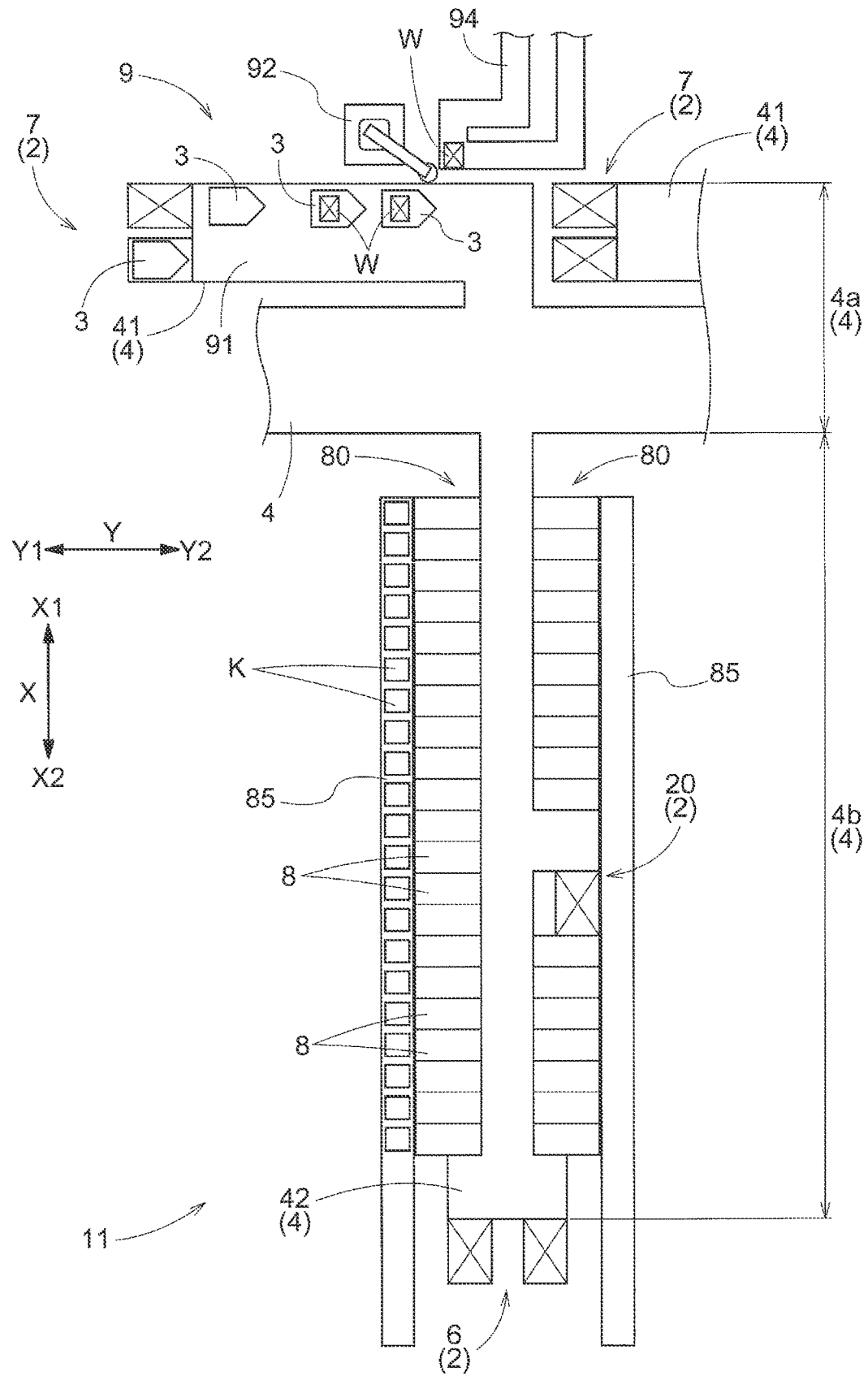
FIG. 11 is a plan view of a first floor according to an alternative embodiment.

(7) The above embodiment has described, as an example, a configuration in which each of the plurality of supply sections 9 includes a work area 93 for a worker P that performs a supply operation for a transport vehicle 3 located in a buffer area 91. However, the present invention is not limited to such a configuration, and it is possible to adopt a configuration in which a supply device 92 that performs a supply operation of supplying an article to a transport vehicle 3 located in the buffer area 91 is disposed in the work area 93. FIG. 11 shows an example of such a configuration. In the example shown in FIG. 11, a supply device 92 is provided adjacent to the buffer area 91. The supply device 92 has the function of transferring articles W placed on the conveyor 94 to transport vehicles 3 located in the buffer area 91. In the illustrated example, the supply device 92 is a picking robot that includes a robot arm.

(8) The above embodiment has described, as an example, a configuration in which the article sorting facility includes the third elevation mechanisms 20 that connect intermediate positions of the first travel paths 4 to intermediate positions of the second travel paths 5. However, the present invention is not limited to such a configuration, and the article sorting facility need not include any third elevation mechanism 20.

(9) The above embodiment has described, as an example, a configuration in which the charging section 28 configured to charge the power storage devices of the transport vehicles 3 is installed on the second floor 21. However, the present invention is not limited to such a configuration, and the charging section 28 may be installed on the first floor 11.

(10) The configurations disclosed in the embodiments described above (including the above-described embodiment and other embodiments; the same applies to the following) are applicable in combination with configurations disclosed in other embodiments so long as no inconsistency arises. With regard to the other configurations as well, the embodiments disclosed herein are in all respects as illustrative, and appropriate changes and modifications may be made thereto without departing from the scope and sprit of the present disclosure.

Outline of the Embodiment

An outline of the above-described article sorting facility will be described below.

An article sorting facility according to the present disclosure is an article sorting facility configured to cause a plurality of transport vehicles to transport articles, thereby sorting the articles, the article sorting facility including: a first floor including a plurality of first travel paths along which the transport vehicles travel; a second floor installed at a different height from the first floor in a vertical direction, and including a plurality of second travel paths along which the transport vehicles travel; a plurality of first elevation mechanisms connecting terminating ends of the first travel paths to starting ends of the second travel paths, and configured to raise and lower the transport vehicles; a plurality of second elevation mechanisms connecting terminating ends of the second travel paths to starting ends of the first travel paths, and configured to raise and lower the transport vehicles; a plurality of receiving sections aligned along each of the plurality of first travel paths, and configured to receive the articles from the transport vehicles; and at least one supply section configured to supply the articles to the transport vehicles in at least one of the second travel paths or in a segment of at least one of the first travel paths, the segment being located on a starting end side of a receiving section group including the plurality of receiving sections disposed along the at least one first travel path, wherein the plurality of second travel paths overlap corresponding first travel paths or corresponding receiving sections as viewed in the vertical direction, at least in a partial segment.

Here, a transport vehicle to which an article has been supplied from the supply section travels along a first travel path, and transports the article to a receiving section among the plurality of receiving sections. The transport vehicle that has delivered the article to the receiving section thereafter travels along a second travel path, and returns to the supply section. With the present configuration, a first travel path serving as a sorting travel path and a second travel path serving as a return path for transport vehicles as described above can be separately disposed on an upper and a lower floor at different heights. Furthermore, end portions of the first travel path and the second travel path are connected to each other by the elevation mechanisms. Accordingly, even if a large number of travel paths for transport vehicles are set, it is possible to minimize the number of locations at which these travel paths intersect each other. Therefore, the efficiency of the transport of articles by the transport vehicles can be easily increased.

With the present configuration, the second travel paths overlap the corresponding first travel paths or the corresponding receiving sections as viewed in the vertical direction, at least in a partial section. Accordingly, even in a configuration including a plurality of first travel paths, a plurality of receiving sections, and a plurality of second travel paths, it is possible to minimize the installation area of the article sorting facility as viewed in the vertical direction.

In this manner, with the present configuration, it is possible to increase the efficiency of the transport of articles by the transport vehicles, while suppressing an increase in the size of the facility.

Here, it is preferable that the plurality of first elevation mechanisms include M first elevation mechanisms (where M is a natural number) in correspondence with the terminating end of each of the first travel paths, and the plurality of second elevation mechanisms include N second elevation mechanisms (where N is a natural number) in correspondence with the starting end of each of the first travel paths.

With the present configuration, at least one first elevation mechanism is provided at the terminating end of each of the plurality of first travel paths, and at least one second elevation mechanism is provided at the starting end of each of the plurality of first travel paths. Accordingly, even if a large number of transport vehicles travel along the first travel paths and the second travel paths, it is possible to prevent congestion of the transport vehicles from occurring in front of the first elevation mechanisms and the second elevation mechanisms. Furthermore, if the number of first elevation mechanisms and the number of second elevation mechanisms are the same, it is also possible to easily prevent congestion of the transport vehicles from occurring at either the first elevation mechanisms or the second elevation mechanisms.

It is preferable that the second floor includes a sum of the second travel paths that is greater than or equal to a sum of the first travel paths.

With the present configuration, a transport vehicle that has transported an article to a receiving section can be easily returned to the supply section quickly.

Accordingly, it is possible to reduce the possibility that none of the transport vehicles have returned to the supply section even though the supply section can supply articles. Accordingly, the efficiency of the transport of articles by the transport vehicles can be easily increased.

It is preferable that each of the first travel paths includes a sorting segment in which the receiving section group is disposed, and the sorting segments of the plurality of first travel paths extend parallel to each other.

With the present configuration, it is possible to easily minimize the installation areas of the respective sorting segments of the plurality of first travel paths and the receiving section groups disposed along the sorting segments as viewed in the vertical direction.

It is preferable that the sorting segments of the plurality of first travel paths extend in a first direction, the sorting segments are aligned in a second direction orthogonal to the first direction as viewed in the vertical direction, and the at least one supply section includes a plurality of supply sections aligned in the second direction.

With the present configuration, the plurality of supply sections can be easily disposed in parallel with the plurality of sorting segments. Accordingly, the plurality of supply sections and the plurality of sorting segments can be easily disposed at relatively close positions. Furthermore, since the plurality of supply sections are disposed, it is possible to increase the efficiency of the supply of articles to the transport vehicles by the supply sections.

Accordingly, the overall efficiency of the transport of articles by the transport vehicles in the article sorting facility can be easily increased.

It is preferable that the article sorting facility further includes:
- a control device configured to control the plurality of transport vehicles,
- wherein the at least one supply section includes a plurality of supply sections,
- each of the plurality of supply sections includes:
  - a buffer area in which to arrange the plurality of transport vehicles; and
  - a work area in which to accommodate either a supply device configured to perform a supply operation of supplying the articles to the transport vehicles located in the buffer area, or a worker who performs the supply operation, and
- the control device is configured to control travel of the plurality of transport vehicles in such a manner that sums of the transport vehicles aligned in the buffer area of each the plurality of supply sections become closer to being equal to each other.

With the present configuration, a plurality of transport vehicles can be put on standby in each of the plurality of buffer areas. This makes it possible to easily reduce unbalance in the number of transport vehicles in the plurality of supply sections. Accordingly, it is possible to reduce the possibility of occurrence of a situation where there is no transport vehicle to receive supply of an article in each of the supply sections.

It is preferable that the article sorting facility further includes at least one third elevation mechanism connecting an intermediate position of at least one of the first travel paths to an intermediate position of at least one of the second travel paths, and configured to raise and lower the transport vehicles.

With the present configuration, a transport vehicle that has delivered an article to a receiving section located between the starting end side of a first travel path and the third elevation mechanism can move to a second travel path more quickly using the third elevation mechanism rather than using the first elevation mechanism. Accordingly, a transport vehicle that has delivered an article can be returned to the supply section quickly.

It is preferable that each of the transport vehicles includes a power storage device, and is configured to travel using power from the power storage device, and
- the second floor includes a charging section configured to charge the power storage devices of the transport vehicles.

With the present configuration, the charging section is installed on the second floor where no receiving section is disposed, thus making it possible to efficiently use the region of the second floor.

It is sufficient that the article sorting facility according to the present disclosure can achieve at least one of the above-described effects.

What is claimed is:

1. An article sorting facility configured to cause a plurality of transport vehicles to transport articles, thereby sorting the articles, the article sorting facility comprising:
   - a first floor comprising a plurality of first travel paths along which the transport vehicles travel;
   - a second floor installed at a different height from the first floor in a vertical direction, and comprising a plurality of second travel paths along which the transport vehicles travel;
   - a plurality of first elevation mechanisms connecting terminating ends of the first travel paths to starting ends of the second travel paths, and configured to raise and lower the transport vehicles;
   - a plurality of second elevation mechanisms connecting terminating ends of the second travel paths to starting ends of the first travel paths, and configured to raise and lower the transport vehicles;
   - a plurality of receiving sections arranged on the first floor and not on the second floor, the plurality of receiving sections being aligned along each of the plurality of first travel paths, and configured to receive the articles from the transport vehicles; and
   - at least one supply section configured to supply the articles to the transport vehicles in at least one of the second travel paths or in a segment of at least one of the first travel paths, the segment located on a starting end side of a receiving section group comprising the plurality of receiving sections disposed along the at least one first travel path,
   - wherein the plurality of second travel paths overlap corresponding first travel paths or corresponding receiving sections as viewed in the vertical direction, at least in a partial segment,
   - wherein each of the plurality of transport vehicles travels on one of the plurality of first travel paths, conveys the article supplied from the supply section to one of the plurality of receiving sections, and then moves to one of the first elevation mechanisms,
   - wherein the transport vehicle moves via the first elevation mechanism to the second floor, travels on one of the plurality of second travel paths, and moves to one of the second elevation mechanisms, and
   - wherein the transport vehicle moves via the second elevation mechanism to the first floor and travels on one of the first travel paths.

2. The article sorting facility according to claim 1,
   - wherein the plurality of first elevation mechanisms comprise M first elevation mechanisms (where M is a natural number) in correspondence with the terminating end of each of the first travel paths, and
   - wherein the plurality of second elevation mechanisms comprise N second elevation mechanisms (where N is a natural number) in correspondence with the starting end of each of the first travel paths.

3. The article sorting facility according to claim 1,
   - wherein the second floor comprises a sum of the second travel paths that is greater than or equal to a sum of the first travel paths.

4. The article sorting facility according to claim 1,
   - wherein each of the first travel paths comprises a sorting segment in which the receiving section group is disposed, and
   - wherein the sorting segments of the plurality of first travel paths extend parallel to each other.

5. The article sorting facility according to claim 4,
wherein the sorting segments of the plurality of first travel paths extend in a first direction,
wherein the sorting segments are aligned in a second direction orthogonal to the first direction as viewed in the vertical direction, and
wherein the at least one supply section comprises a plurality of supply sections aligned in the second direction.

6. The article sorting facility according to claim 5,
wherein each of the plurality of first travel paths includes a first merging segment extending in the second direction in addition to the sorting segments, and
wherein the first merging segment includes a plurality of lanes, is formed by a plurality of sorting segments being connected to each other at ends thereof on one side in the first direction, is shared with the plurality of first travel paths, and includes the starting end of each of the first travel paths.

7. The article sorting facility according to claim 6,
wherein each of the plurality of second travel paths includes a straight segment and a second merging segment,
wherein the plurality of straight segments extend in the second direction and are disposed corresponding to the plurality of sorting segments, and
wherein each of the second merging segments includes a plurality of lanes, formed as a result of a plurality of straight segments being merged at end portions thereof on the one side in the first direction, is shared with the plurality of second travel paths, and includes the starting end of each of the second travel paths.

8. The article sorting facility according to claim 1, further comprising:
a control device configured to control the plurality of transport vehicles,
wherein the at least one supply section comprises a plurality of supply sections,
wherein each of the plurality of supply sections comprises:
a buffer area in which to arrange the plurality of transport vehicles; and
a work area in which to accommodate either a supply device configured to perform a supply operation of supplying the articles to the transport vehicles located in the buffer area, or a worker who performs the supply operation, and
wherein the control device is configured to control travel of the plurality of transport vehicles such that sums of the transport vehicles aligned in the buffer area of each the plurality of supply sections become closer to equal to each other.

9. The article sorting facility according to claim 1, further comprising:
at least one third elevation mechanism connecting an intermediate position of at least one of the first travel paths to an intermediate position of at least one of the second travel paths, and configured to raise and lower the transport vehicles,
wherein each of the plurality of transport vehicles is further configured to move from the first floor to the second floor via the third elevation mechanism.

10. The article sorting facility according to claim 1,
wherein each of the transport vehicles comprises a power storage device, and is configured to travel using power from the power storage device, and
wherein the second floor comprises a charging section configured to charge the power storage devices of the transport vehicles.

11. The article sorting facility of claim 1, further comprising:
a plurality of transport devices adjacent to the corresponding receiving section groups,
wherein each of receiving sections is configured to transfer the article, received from the transport vehicle, to the adjacent transport device, and
wherein the transport device is configured to transport the article, received from the receiving section, from the adjacent receiving section group.

\* \* \* \* \*